US011734966B1

(12) United States Patent
Engelkemier et al.

(10) Patent No.: US 11,734,966 B1
(45) Date of Patent: Aug. 22, 2023

(54) RECURSIVE SYSTEM LAYER ANALYSIS FOR ACHIEVING FUNCTIONAL SAFETY

(71) Applicant: Ethernovia Inc., San Jose, CA (US)

(72) Inventors: Darren S. Engelkemier, Menlo Park, CA (US); Oscar Ballan, San Francisco, CA (US); Roy T. Myers, Jr., Santa Clara, CA (US); Hossein Sedarat, San Jose, CA (US); Ramin Shirani, Morgan Hill, CA (US)

(73) Assignee: Ethernovia Inc., San Jose, CA (US)

( * ) Notice: Subject to any disclaimer, the term of this patent is extended or adjusted under 35 U.S.C. 154(b) by 50 days.

(21) Appl. No.: 17/132,556

(22) Filed: Dec. 23, 2020

Related U.S. Application Data

(60) Provisional application No. 63/092,246, filed on Oct. 15, 2020.

(51) Int. Cl.
*G07C 5/08* (2006.01)

(52) U.S. Cl.
CPC ................................. *G07C 5/0808* (2013.01)

(58) Field of Classification Search
CPC .................................................... G07C 5/0808
See application file for complete search history.

(56) References Cited

U.S. PATENT DOCUMENTS

| 4,967,347 | A | 10/1990 | Smith et al. |
| 10,810,079 | B2 | 10/2020 | Halbert et al. |
| 2005/0106713 | A1* | 5/2005 | Phan ................ A61B 5/150358 |
| | | | 702/19 |
| 2014/0013182 | A1 | 1/2014 | Cheng et al. |
| 2015/0332463 | A1* | 11/2015 | Galera ................. G06V 40/103 |
| | | | 382/103 |
| 2017/0139761 | A1 | 5/2017 | Song et al. |
| 2017/0272102 | A1 | 9/2017 | Goldenberg et al. |
| 2018/0322008 | A1 | 11/2018 | Chung et al. |
| 2020/0004627 | A1 | 1/2020 | Sharon et al. |

(Continued)

FOREIGN PATENT DOCUMENTS

| CN | 107085648 A | * | 8/2017 | |
| WO | WO-2019142484 A1 | * | 7/2019 | ............ B60W 40/09 |

OTHER PUBLICATIONS

US 2022/0035363 A1, 02/2022, Engelkemier et al. (withdrawn)

(Continued)

*Primary Examiner* — Joseph J Dallo
(74) *Attorney, Agent, or Firm* — Schwegman Lundberg & Woessner, P.A.

(57) ABSTRACT

Disclosed are systems, methods, and non-transitory computer-readable media for achieving functional safety compliance using a recursive system layer analysis. A functional safety system uses a recursive method to sequentially analyze each layer of a target environment from a bottom layer (e.g., IP layer) to a top layer (e.g., system layer). If a target diagnostic coverage level is not achieved at a given layer, the functional safety system attempts to achieve the target diagnostic coverage level at the next layer based on the residual faults from the lower layer. At the top layer, the functional safety system may apply the context of the target environment to reduce the scope of the coverage analysis based on the given application. The functional safety system may also use the context of the target environment to the reanalyze the lower layers as needed.

20 Claims, 8 Drawing Sheets

(56) References Cited

U.S. PATENT DOCUMENTS

2020/0043256 A1* 2/2020 Rocci .................. G06F 11/3664
2020/0364958 A1* 11/2020 Lewis .................... G07C 5/008
2021/0049068 A1 2/2021 Schaefer et al.

OTHER PUBLICATIONS

"U.S. Appl. No. 17/451,051, Non Final Office Action dated Sep. 1, 2022", 10 pgs.
"U.S. Appl. No. 17/451,049, Non Final Office Action dated Sep. 2, 2022", 13 pgs.
Lim, Seung-Ho, "A Stepwise Rate-Compatible LDPC and Parity Management in NAND Flash U Memory-Based Storage Devices", IEEE Access, vol. 8, pp. 162491-162506, 2020, 16 pgs.
"U.S. Appl. No. 17/451,051, Response filed Nov. 29, 2022 to Non Final Office Action dated Sep. 1, 2022", 11 pgs.
"U.S. Appl. No. 17/451,049, Response filed Dec. 1, 2022 to Non Final Office Action dated Sep. 2, 2022", 12 pgs.

* cited by examiner

RECURSIVE SYSTEM LAYER ANALYSIS FOR ACHIEVING FUNCTIONAL SAFETY

CROSS-REFERENCE TO RELATED APPLICATIONS

The present application claims the benefit of priority of U.S. Provisional Application No. 63/092,246, filed on Oct. 15, 2020, which is incorporated herein by reference in its entirety.

TECHNICAL FIELD

An embodiment of the present subject matter relates generally to functional safety, and more specifically, to a recursive system layer analysis for achieving functional safety.

BACKGROUND

Safety-critical automotive applications have stringent demands for functional safety and reliability. The International Organization for Standardization (ISO) has established an international standard known as ISO 26262 "Road vehicles—Functional safety." Although ISO 26262 is titled "Road vehicles—Functional safety," it relates to the functional safety of the electrical and electronic systems within vehicles, including the systems as a whole.

ISO 26262 defines four Automotive Safety Integrity Levels (ASILs), spanning from a least stringent safety level defined as ASIL-A to a most stringent safety level defined as ASIL-D. Each ASIL defines a level of safety measures that are required for avoiding an unreasonable residual risk. For example, ASIL-B requires that 90% of faults that can propagate and cause a system failure be detected, whereas the more stringent safety level of ASIL-D requires that 99% of these faults be detected. ASIL-D is targeted for mission critical applications, such as Integrated Circuits (ICs) used for braking, steering, or autonomous driving, that could cause life-threatening to fatal injuries if a failure occurred.

A highly stringent safety level, such as that defined by ASIL-D, generally requires effective diagnostic coverage at all layers (e.g., Intellectual Property (IP) layer, semiconductor layer, software layer, system layer, etc.). Accomplishing this is particularly difficult as current ICs are often comprised of millions of transistors, and many of the IPs, ICs, and/or software are designed "generically" or "out of context." Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
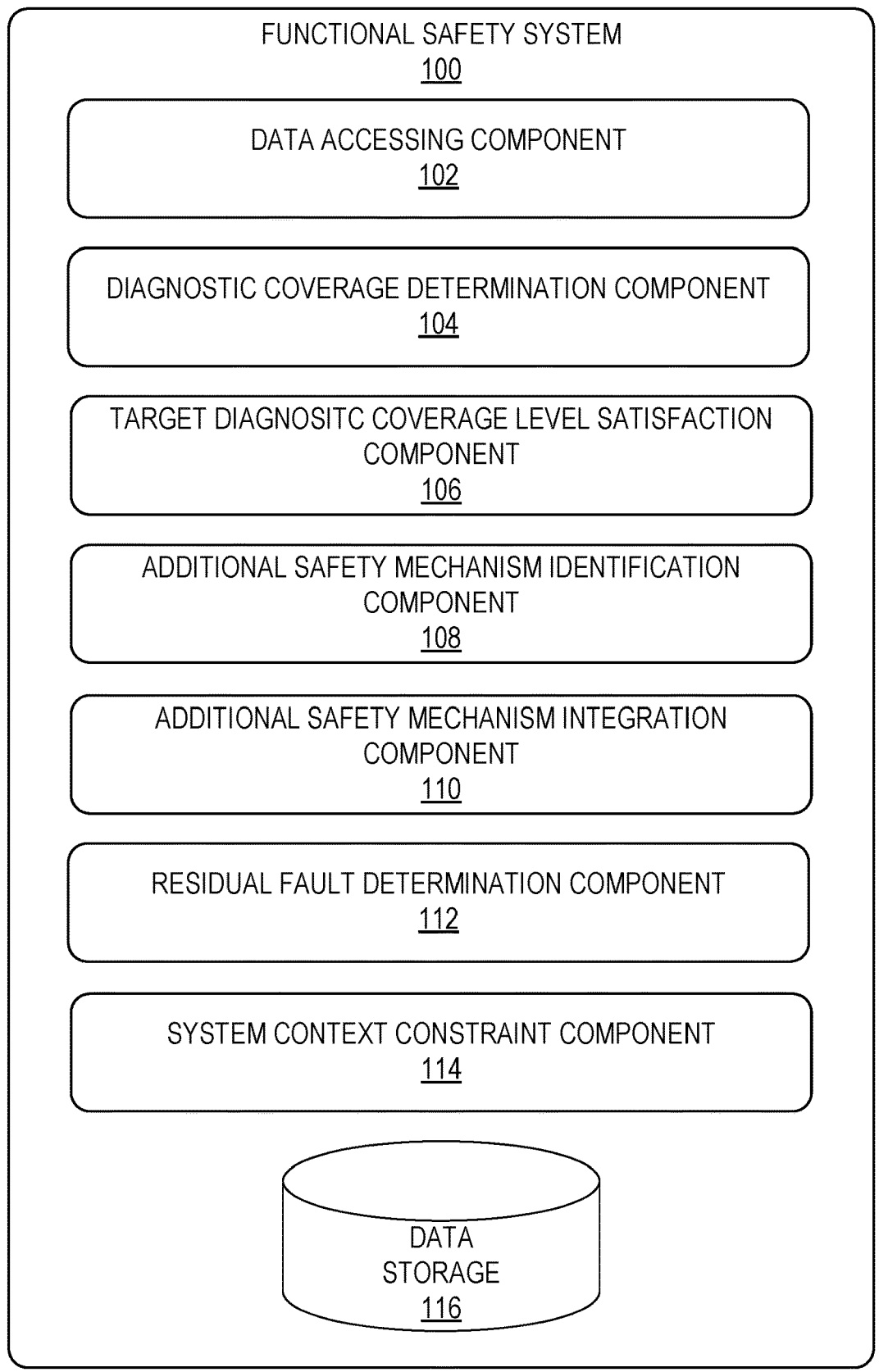
FIG. 1 is a block diagram of a functional safety system, according to certain example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for achieving functional safety compliance using a recursive system layer analysis. A functional safety system automates the process of achieving a target diagnostic coverage level in a target environment. A diagnostic coverage level describes the effectiveness of included safety mechanisms at detecting faults in the target environment. A safety mechanism as a technical solution implemented by electronic functions or elements, or by other technologies, to detect faults or control failures to achieve or maintain a safe state. The effectiveness of a safety mechanism can be measured using various metrics, such as a single-point fault metric (SPFM), latent (e.g., multi-point) fault metric (LFM), Failure in Time (FIT), as well as a probability of the risk (e.g., probabilistic metrics for hardware failures (PMHF)).

The functional safety system uses a recursive method to sequentially analyze each layer of a target environment starting from a bottom layer (e.g., IP layer) to a top layer (e.g., system layer). For example, the functional safety system determines a realized diagnostic coverage level of a layer (e.g., IP layer) and whether the realized diagnostic coverage level meets a target diagnostic coverage level (e.g., target ASIL). If the realized diagnostic coverage level does not meet the target diagnostic coverage level, the functional safety system attempts to identify and implement additional safety mechanisms to meet the target diagnostic coverage level.

If the target diagnostic coverage level is not achieved by adding additional safety mechanisms, the functional safety system attempts to achieve the target diagnostic coverage level at the next layer (e.g., semiconductor layer) in the target environment. For example, the functional safety system may analyze the next layer based on the residual faults from the lower layer to determine whether the realized diagnostic coverage level of the next layer meets the target diagnostic coverage level, whether additional safety mechanisms can be added to meet the target diagnostic coverage level, and the like.

Residual faults at any layer of the target environment affect the achieved diagnostic coverage level of the target environment as a whole. Residual faults that at one layer may be easier to address at a subsequent layer, such as in software or through an outside redundant mechanism. Passing fault data describing residual faults to the analysis of the higher layers may eliminate the need to re-analyze the faults at the layer thereby potentially increasing the speed and ease at which the target diagnostic coverage level is achieved. An example is a lock step processor. An individual processor may not meet a target diagnostic coverage level, however, instantiating a second or redundant processer with a voting or checking mechanism, the target diagnostic coverage level for the target environment can be achieved even though the individual processor by itself meet a target diagnostic coverage level.

The functional safety system repeats this process until the top layer (e.g., system layer) of the target environment is reached. At the top layer, the context of the target environment, such the requirements, design and application of the target environment, are known. The functional safety system uses this context when analyzing the top layer. For example, the functional safety system uses the context of the target environment to constrain the scope of the diagnostic coverage analysis to a particular application. That is, the functional safety system may be able to reduce the scope of the coverage analysis by eliminating portions of the function or IP that are not needed within the context of the target environment.

The functional safety system may also apply the context of the target environment to reanalyze the lower layers as needed. For example, if the target diagnostic coverage level is not achieved at the top layer, the functional safety system may apply the context of the target environment to lower layers along with the residual faults in an attempt to achieve the target diagnostic coverage level. That is, the functional safety system uses the context of the target environment to constrain the scope of the diagnostic coverage analysis at a lower layer based on the particular application.

The recursive system layer analysis used by the functional safety system simplifies the technically difficult process of complying with functional safety requirements and is particularly helpful when using components (e.g., IPs, ICs, software) that were designed "generically" or "out of context." Generic and Safety Element out of Context (SEooC) components are components that are offered "off the shelf" to be used in a variety of applications. While use of generic and/or SEooC components decreases the time and cost associated with development, these components are not developed in the context of a particular system or vehicle. That is, the components are designed without knowledge of the specific requirements, design, and/or application of the final target environment. Accordingly, complying with stringent functional safety requirement with the use of generic and/or SEooC components can be highly difficult.

FIG. 1 is a block diagram of a functional safety system 100, according to certain example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the functional safety system 100 to facilitate additional functionality that is not specifically described herein.

The functional safety system 100 is one or more computing devices configured to automate the process of achieving a target diagnostic coverage level in a target environment. The functional safety system 100 may be implemented using any of a variety of types of computing devices, such as computing devices including some or all of the features, components, and peripherals of the machine 800 shown in FIG. 8.

As shown, the functional safety system 100 includes a data accessing component 102, a diagnostic coverage determination component 104, a target diagnostic coverage level satisfaction component 106, an additional safety mechanism identification component 108, an additional safety mechanism integration component 110, a residual fault determination component 112, a system context constraint component 114, and a data storage 116.

The data accessing component 102 accesses data used by the functional safety system 100 to automate the process of achieving a target diagnostic coverage level in a target environment. For example, the data accessing component 102 accesses data describing the target environment, including sets of data describing the various layers of the target environment (e.g., IP layer, semiconductor layer, software layer, system layer, etc.). The data describing the target environment may describe the structure and behavior of the various electronic circuits and/or software in the target environment. For example, the data may include a hardware description language (HDL) description of the target environment at the Register Transfer Level (RTL) that provides a precise and formal description of the various electronic circuits in the target environment. The HDL description allows for an automated analysis and simulation of the various electronic circuits as well as generation of a netlist describing the connectivity of the various electronic circuits. The data describing the target environment may also include the schematics of boards, other semiconductors, Electronic Control Units (ECUs), or electronics on the boards or modules, or at system or network levels, as well as software or programs used by ECUs or processors.

The data accessing component 102 also accesses data defining a target diagnostic coverage level for the target environment. For example, the target diagnostic coverage level may be defined by an ASIL, such as ASIL-D. The data accessing component 102 may access the data from the data storage 116 and provide the accessed data to the other components of the functional safety system 100.

The diagnostic coverage determination component 104 determines a realized diagnostic coverage level of a layer of the target environment. The realized diagnostic coverage level of a layer of the target environment indicates the effectiveness of the implemented safety mechanisms at detecting faults at the layer of the target environment. For example, the realized diagnostic coverage level may be a value representing a percentage of faults that can be detected by the included safety mechanisms.

The diagnostic coverage determination component 104 determines a realized diagnostic coverage level based on a set of data describing the layer of the target environment and, optionally, data describing residual faults at a lower layer of the target environment and/or the context of the target environment. The diagnostic coverage determination component 104 may determine a realized diagnostic coverage level using various techniques. For example, the diagnostic coverage determination component 104 can determine the realized diagnostic coverage level using machine learning/artificial intelligence techniques based on known standard functional safety coverage mechanisms, patterns, and key words or being supplied a list of the layer's functional safety mechanisms and locations. The diagnostic coverage determination component 104 can also determine the realized diagnostic coverage level using a formal cone of logic, by insertion of faults to determine if the safety mechanisms can detect the inserted faults, inputted coverage file, and/or other automated techniques.

The target diagnostic coverage level satisfaction component 106 determines whether the target diagnostic coverage level has been satisfied. For example, the target diagnostic coverage level satisfaction component 106 compares the realized diagnostic coverage level determined by the diagnostic coverage determination component 104 to the target diagnostic coverage level. If the realized diagnostic coverage level meets or exceeds the target diagnostic coverage level, the target diagnostic coverage level satisfaction component 106 determines that the target diagnostic coverage level has been satisfied (e.g., the functional safety requirement has been met). Alternatively, if the realized diagnostic coverage level does not meet or exceeds the target diagnostic coverage level (e.g., the realized diagnostic coverage level is less than the target diagnostic coverage level), the target diagnostic coverage level satisfaction component 106 determines that the target diagnostic coverage level has been not satisfied (e.g., the functional safety requirement has not been met).

The additional safety mechanism identification component 108 attempts to identify additional safety mechanisms to implement in a given layer to meet the target diagnostic coverage level. For example, the target diagnostic coverage level satisfaction component 106 may notify the additional safety mechanism identification component 108 upon determining that the realized diagnostic coverage level does not meet or exceeds the target diagnostic coverage level at the layer. In response, the additional safety mechanism identification component 108 attempts to identify additional safety mechanisms to meet the target diagnostic coverage level.

The additional safety mechanism identification component 108 may identify the additional safety mechanisms using various techniques. In some embodiments, the additional safety mechanism identification component 108 may use machine learning/artificial intelligence techniques to identify the additional safety mechanisms. For example, a machine learning model may be trained based on data sets defining target environments that strict diagnostic coverage levels. The additional safety mechanism identification component 108 may use data defining a target environment, layer of a target environment, residual faults at a lower layer, and/or the context of the target environment as input into the machine learning model. In turn, the machine learning model may provide an output identifying the safety mechanisms with the highest likelihood of increasing diagnostic coverage level of the layer.

As another example, the additional safety mechanism identification component 108 may identify the additional safety mechanism using pattern matching techniques, such as by matching safety mechanism to known patterns or individual components included in the layer. For example, the additional safety mechanism identification component 108 may maintain a list of additional functional safety mechanisms and locations and/or components to which the safety mechanisms can be effectively implemented.

The additional safety mechanism integration component 110 integrates the identified safety mechanisms to the layer of the target environment. The safety mechanisms may be implemented in hardware or software. Further, the safety mechanisms may be implemented internal or external to the layer (e.g., IP). To implement the additional safety mechanisms, the additional safety mechanism integration component 110 may update the data describing the target environment, such as the HDL description, schematics, and/or software. For example, the additional safety mechanism integration component 110 accesses the data describing the target environment (e.g., HDL description, schematics, software) from the data storage 116 and updates the data based on the additional safety mechanisms. The updated data may then be accessed by the other components of the functional safety system 100, such as by the data accessing component 102 to perform a subsequent diagnostic coverage analysis.

The functional safety system 100 may repeatedly perform subsequent diagnostic coverage analysis at a layer (e.g., determine the realized diagnostic coverage level of the layer, determine whether the realized diagnostic coverage level meets the target diagnostic coverage level, and identify/implement additional safety measures) until the realized diagnostic coverage level meets the target diagnostic coverage level or an exit condition has been triggered. For example, the exit condition may be a specified time period elapsing (e.g., a timeout), a determination that all additional safety mechanisms have been exhausted, and/or that addition of additional safety measures will not increase the diagnostic coverage level beyond a predetermined threshold.

The residual fault determination component 112 generates fault data describing the residual faults of the layer. The fault data can be used to assess whether the residual faults may be addressed at a subsequent higher layer in the computing system. The fault data may describe the residual faults, impact of the residual faults, and how the residual faults may be addressed at a higher layer in either hardware and/or software.

As explained earlier, in some situations the system context of the target environment is known and can be used to achieve the target diagnostic coverage level. For example, at the top layer of the target environment, the context of the target environment, such the requirements, design and application of the target environment, are known. The system context can be used to limit the scope of a diagnostic coverage analysis based on the particular application. For example, the system context can be used to limit the scope of the diagnostic coverage analysis to the portions of the target environment that are used within the given application.

The system context constraint component 114 determines the limited scope of the diagnostic coverage analysis based on the system context. For example, the system context constraint component 114 identifies any functions and/or IP at that are not needed within the known system context of the target environment. The system context constraint component 114 may provide data describing the limited scope of the diagnostic coverage analysis to the other components of the functional safety system 100. For example, the system context constraint component 114 may provide the data describing the limited scope of the diagnostic coverage to the diagnostic coverage determination component 104, a target diagnostic coverage level satisfaction component 106, and/or the additional safety mechanism identification component 108 for use during the diagnostic coverage analysis.

Figure 2:
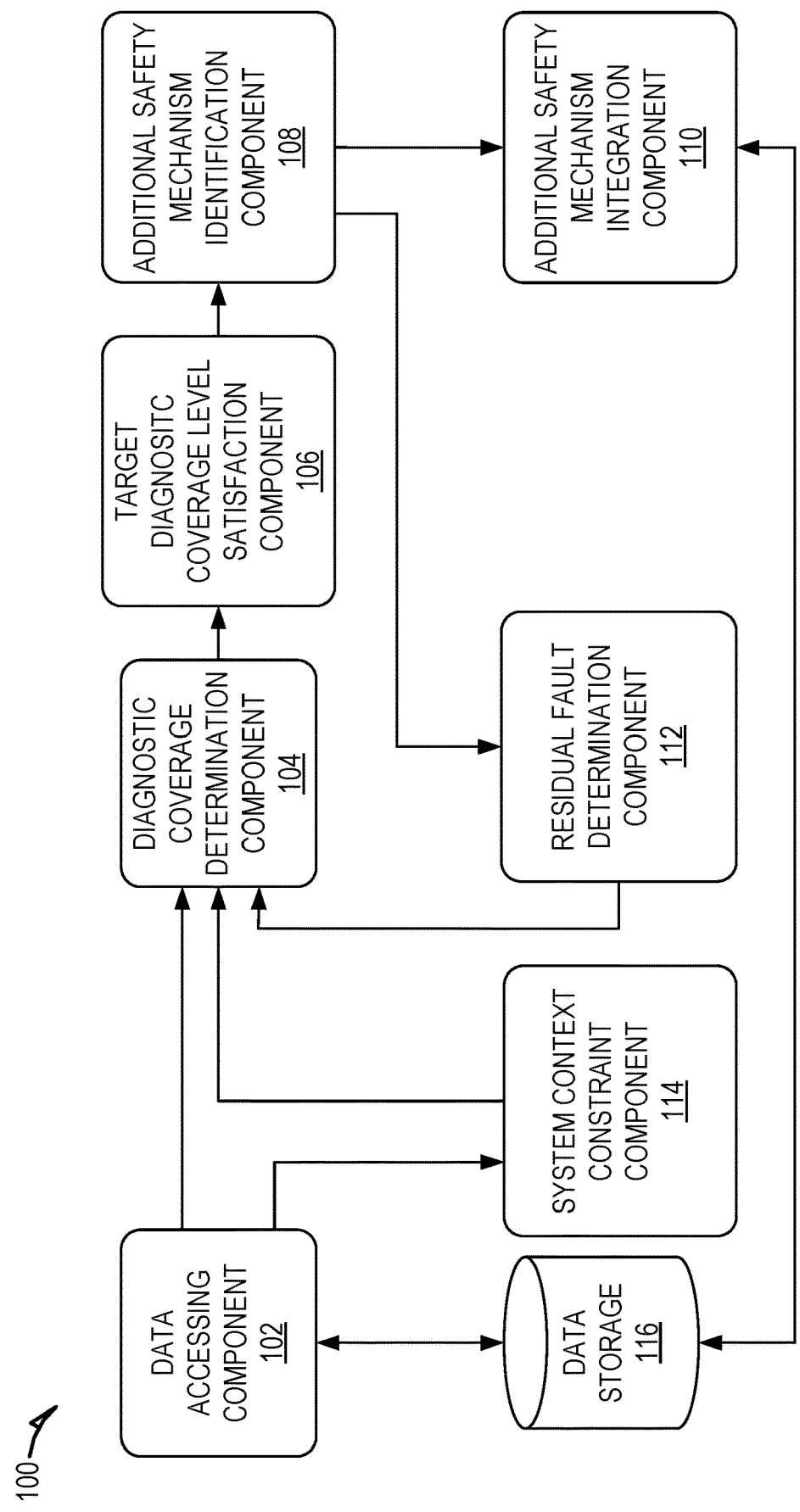
FIG. 2 is a block diagram showing communication signaling within a functional safety system, according to some example embodiments.

FIG. 2 is a block diagram showing communication signaling within a functional safety system 100, according to some example embodiments. As shown, the data accessing component 102 communicates with the data storage 116, system context constraint component 114 and the diagnostic coverage determination component 104.

The data accessing component 102 communicates with the data storage 116 to access data such as data describing the various layers of the target environment (e.g., HDL description) and the target diagnostic coverage level of the target environment. The data accessing component 102 provides data to the diagnostic coverage determination component 104 and the system context constraint component 114. For example, the data accessing component 102 provides the diagnostic coverage determination component 104 with the HDL description and the target diagnostic coverage level for use during the diagnostic coverage analysis.

The data accessing component 102 may also provide the system context constraint component 114 with the data describing the top layer of the target environment and/or other data providing the system context of the target environment. The system context constraint component 114 uses the received data to determine the limited scope of the diagnostic coverage analysis based on the system context. The system context constraint component 114 provides the limited scope of the diagnostic coverage analysis to the diagnostic coverage determination component 104.

The diagnostic coverage determination component 104 receives data from the data accessing component 102, the system context constraint component 114 and the residual fault determination component 112. The diagnostic coverage determination component 104 uses the received data during the diagnostic coverage analysis. For example, the diagnostic coverage determination component 104 receives data describing a layer of the target environment and/or the target diagnostic coverage level from the data accessing component 102. The diagnostic coverage determination component 104 may also optionally receive data describing the limited scope of the diagnostic coverage analysis from the system context constraint component 114 and/or fault data describing residual faults of a layer from the residual fault determination component 112. For example, the system context constraint component 114 provides data to the diagnostic coverage determination component 104 when the system context of the target environment is known (e.g., when analyzing the top layer or after analyzing the top layer). Similarly, the residual fault determination component 112 provides the diagnostic coverage determination component 104 when a residual fault exists from a lower layer of the target environment.

The diagnostic coverage determination component 104 uses the received data to determine the realized diagnostic coverage of the layer of the target environment. The diagnostic coverage determination component 104 may then provide the realized diagnostic coverage to the target diagnostic coverage level satisfaction component 106, which determines whether the target diagnostic coverage level has been satisfied.

The target diagnostic coverage level satisfaction component 106 can communicate with the additional safety mechanism identification component 108. For example, the target diagnostic coverage level satisfaction component 106 may notify the additional safety mechanism identification component 108 that the target diagnostic coverage level has not been satisfied. In turn the, the additional safety mechanism identification component 108 can identify additional safety mechanisms and/or determine if an exit condition has been triggered.

The additional safety mechanism identification component 108 communicates with the additional safety mechanism integration component 110 and the residual fault determination component 112. For example, the additional safety mechanism identification component 108 provides the additional safety mechanism integration component 110 with data identifying additional safety mechanisms to be implemented. In turn, the additional safety mechanism integration component 110 updates the data describing the target environment. For example, the additional safety mechanism integration component 110 communicates with the data storage 116 to access and update the data describing the target environment (e.g., HDL description, schematics, software).

The additional safety mechanism identification component 108 many communicate with the residual fault determination component 112 in the event that an exit trigger has been satisfied. This may cause the residual fault determination component 112 to determine fault data describing any residual faults at the layer of the target environment. The residual fault determination component 112 may provide the fault data to the diagnostic coverage determination component 104 for use when analyzing a subsequent layer of the target environment.

Figure 3:
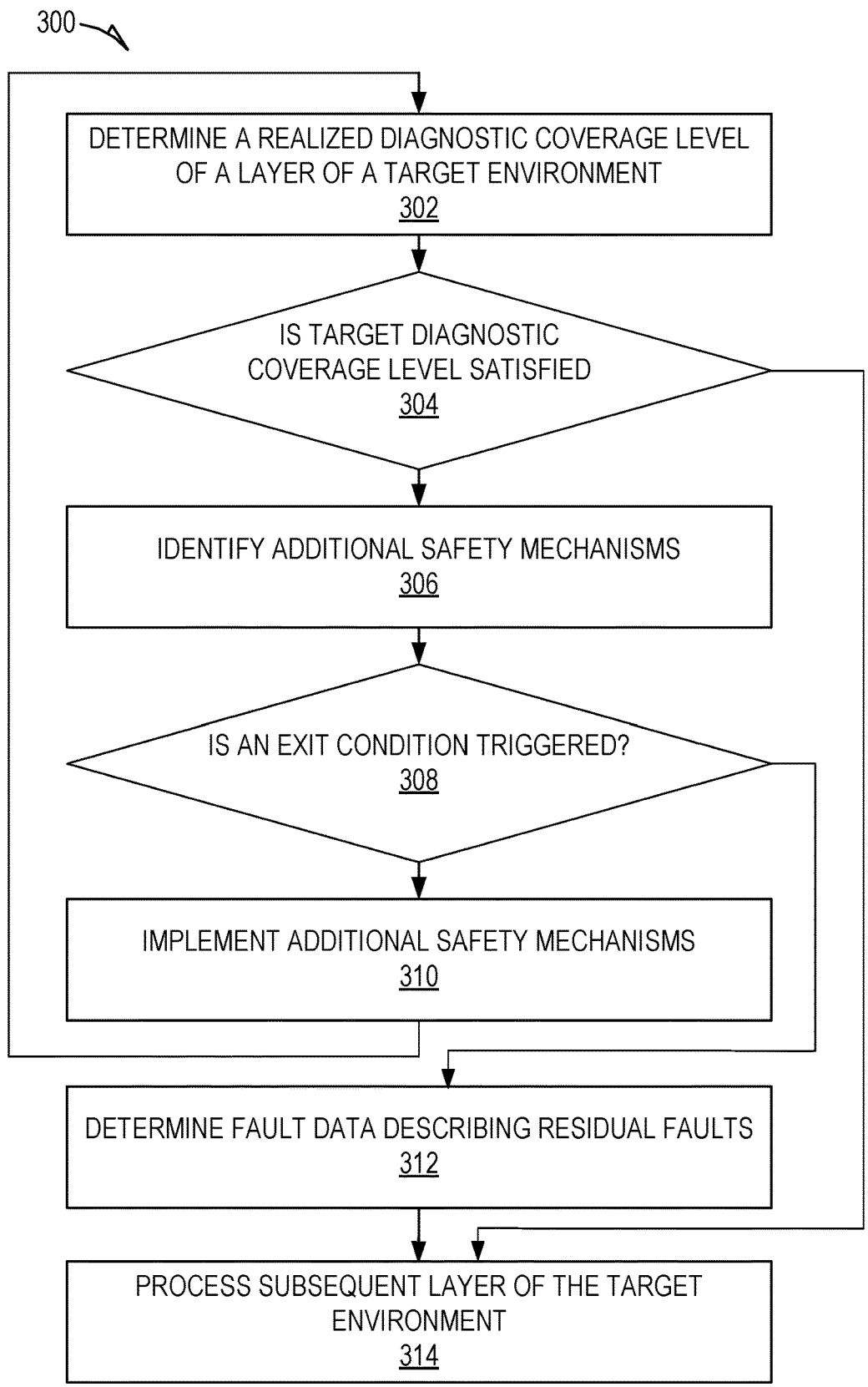
FIG. 3 is a flowchart showing a method for a recursive system layer analysis for achieving functional safety, according to some example embodiments.

FIG. 3 is a flowchart showing a method 300 for a recursive system layer analysis for achieving functional safety, according to some example embodiments. The method 300 may be embodied in computer readable instructions for execution by one or more processors such that the operations of the method 300 may be performed in part or in whole by the functional safety system 100; accordingly, the method 300 is described below by way of example with reference to the functional safety system 100. However, it shall be appreciated that at least some of the operations of the method 300 may be deployed on various other hardware and/or software configurations and the method 300 is not intended to be limited to the functional safety system 100.

At operation 302, the diagnostic coverage determination component 104 determines a realized diagnostic coverage level of a layer of a target environment. The realized diagnostic coverage level of a layer of the target environment indicates the effectiveness of the implemented safety mechanisms at detecting faults at the layer of the target environment. For example, the realized diagnostic coverage level may be a value representing a percentage of faults that can be detected by the included safety mechanisms.

The diagnostic coverage determination component 104 determines a realized diagnostic coverage level based on a set of data describing the layer of the target environment and, optionally, data describing residual faults at a lower layer of the target environment and/or the context of the target environment. The diagnostic coverage determination component 104 may determine a realized diagnostic coverage level using various techniques. For example, the diagnostic coverage determination component 104 can determine the realized diagnostic coverage level using machine learning/artificial intelligence techniques based on known standard functional safety coverage mechanisms, patterns, and key words or being supplied a list of the layer's functional safety mechanisms and locations. The diagnostic coverage determination component 104 can also determine the realized diagnostic coverage level using a formal cone of logic, by insertion of faults to determine if the safety mechanisms can detect the inserted faults, inputted coverage file, and/or other automated techniques.

At operation 304, the target diagnostic coverage level satisfaction component 106 determines whether a target diagnostic coverage level is satisfied. For example, the target diagnostic coverage level satisfaction component 106 compares the realized diagnostic coverage level determined by the diagnostic coverage determination component 104 to the target diagnostic coverage level.

If the realized diagnostic coverage level meets or exceeds the target diagnostic coverage level, the target diagnostic coverage level satisfaction component 106 determines that the target diagnostic coverage level has been satisfied (e.g., the functional safety requirement has been met) and the method 300 continues to operation 314, at which the functional safety system 100 processes a subsequent layer of the target environment.

Alternatively, if the realized diagnostic coverage level does not meet or exceeds the target diagnostic coverage level (e.g., the realized diagnostic coverage level is less than the target diagnostic coverage level), the target diagnostic coverage level satisfaction component 106 determines that the target diagnostic coverage level has been not satisfied (e.g., the functional safety requirement has not been met) and the method 300 continues to operation 306.

At operation 306, the additional safety mechanism identification component 108 identifies additional safety mechanisms. The additional safety mechanism identification component 108 may identify the additional safety mechanisms using various techniques. In some embodiments, the additional safety mechanism identification component 108 may use machine learning/artificial intelligence techniques to identify the additional safety mechanisms. For example, a machine learning model may be trained based on data sets defining target environments that have achieved strict diagnostic coverage levels. The additional safety mechanism identification component 108 may use data defining a target environment, layer of a target environment, residual faults at a lower layer, and/or the context of the target environment as input into the machine learning model. In turn, the machine learning model or algorithm may provide an output identifying the safety mechanisms with the highest likelihood of increasing diagnostic coverage level of the layer.

As another example, the additional safety mechanism identification component 108 may identify the additional safety mechanism using pattern matching techniques, such as by matching safety mechanism to known patterns or individual components included in the layer. For example, the additional safety mechanism identification component 108 may maintain a list of additional functional safety mechanisms and locations and/or components to which the safety mechanisms can be effectively implemented.

At operation 308, the additional safety mechanism identification component 108 determines whether an exit condition has been triggered. For example, the exit condition may be a specified time period elapsing (e.g., a timeout), a determination that all additional safety mechanisms have been exhausted, and/or that addition of additional safety measures will not increase the diagnostic coverage level beyond a predetermined threshold (e.g., effectiveness level). If the additional safety mechanism identification component 108 determines that an exit condition has not been triggered, the method 300 continuation to operation 310, where the additional safety mechanism integration component 110 implements additional safety mechanisms.

To implement the additional safety mechanisms, the additional safety mechanism integration component 110 updates the data describing the target environment. For example, the additional safety mechanism integration component 110 accesses the data describing the target environment from the data storage 116 and updates the data describing the target environment based on the additional safety mechanisms. The updated data describing the target environment may then be accessed by the other components of the functional safety system 100, such as by the data accessing component 102 to perform a subsequent diagnostic coverage analysis.

The method then returns to operation 302 where the diagnostic coverage analysis is repeated based on the layer implemented with the additional safety mechanisms.

If at operation 308, the additional safety mechanism identification component 108 determines that an exit condition has been triggered, the method 300 continuation to operation 312, where the residual fault determination component 112 determines fault data describing residual faults. The fault data can be used to assess whether the residual faults may be addressed at a subsequent higher layer in the computing system. The fault data may describe the residual faults, impact of the residual faults, and how the residual faults may be addressed at a higher layer.

At operation 314, the functional safety system 100 processes a subsequent layer of the target environment. For example, the functional safety system 100 may process a higher layer in the target environment. Alternatively, if the layer is a top layer in the target environment, the functional safety system 100 may process a lower layer of the target environment determined to be a source of a residual fault. For example, the functional safety system 100 may reprocess a lower layer based on the system context of the target environment (e.g., as described in relation to FIG. 6).

Figure 4:
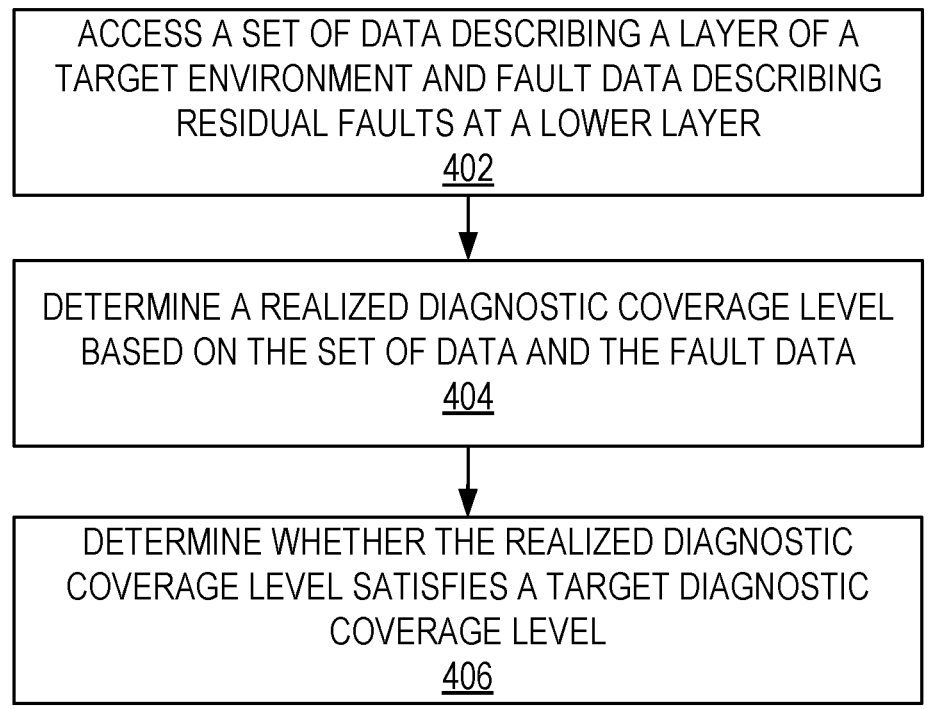
FIG. 4 is a flowchart showing a method for determining a realized diagnostic coverage level, according to some example embodiments.

FIG. 4 is a flowchart showing a method 400 for determining a realized diagnostic coverage level, according to some example embodiments. The method 400 may be embodied in computer readable instructions for execution by one or more processors such that the operations of the method 400 may be performed in part or in whole by the functional safety system 100; accordingly, the method 400 is described below by way of example with reference to the functional safety system 100. However, it shall be appreciated that at least some of the operations of the method 400 may be deployed on various other hardware and/or software configurations and the method 400 is not intended to be limited to the functional safety system 100.

At operation 402, the data accessing component 102 accesses a set of data describing a layer of a target environment and fault data describing residual faults at a lower layer. The data describing the target environment may describe the structure and behavior of the various electronic circuits in the target environment. For example, the data may include a hardware description language (HDL) description of the target environment at the Register Transfer Level (RTL) that provides a precise and formal description of the various electronic circuits in the target environment. The HDL description allows for an automated analysis and simulation of the various electronic circuits as well as generation of a netlist describing the connectivity of the various electronic circuits.

The data accessing component 102 also accesses data defining a target diagnostic coverage level for the target environment. For example, the target diagnostic coverage level may be defined by an ASIL, such as ASIL-D. The data accessing component 102 may access the data from the data storage 116 and provide the accessed data to the other components of the functional safety system 100.

The fault data is accessed from the residual fault determination component 112. The fault data describes the residual faults from the layer. The fault data can be used to assess whether the residual faults may be addressed at a subsequent higher layer in the computing system. The fault data may describe the residual faults, impact of the residual faults, and how the residual faults may be addressed at a higher layer.

At operation 404, the diagnostic coverage determination component 104 determines a realized diagnostic coverage level based on the set of data and the fault data. In some embodiments, the diagnostic coverage determination component 104 may also determine the realized diagnostic coverage level based on the system context, if available, as described in relation to FIG. 5.

At operation 406, the target diagnostic coverage level satisfaction component 106 determines whether the realized diagnostic coverage level satisfies a target diagnostic coverage level. For example, the target diagnostic coverage level satisfaction component 106 compares the realized diagnostic coverage level determined by the diagnostic coverage determination component 104 to the target diagnostic coverage level.

Figure 5:
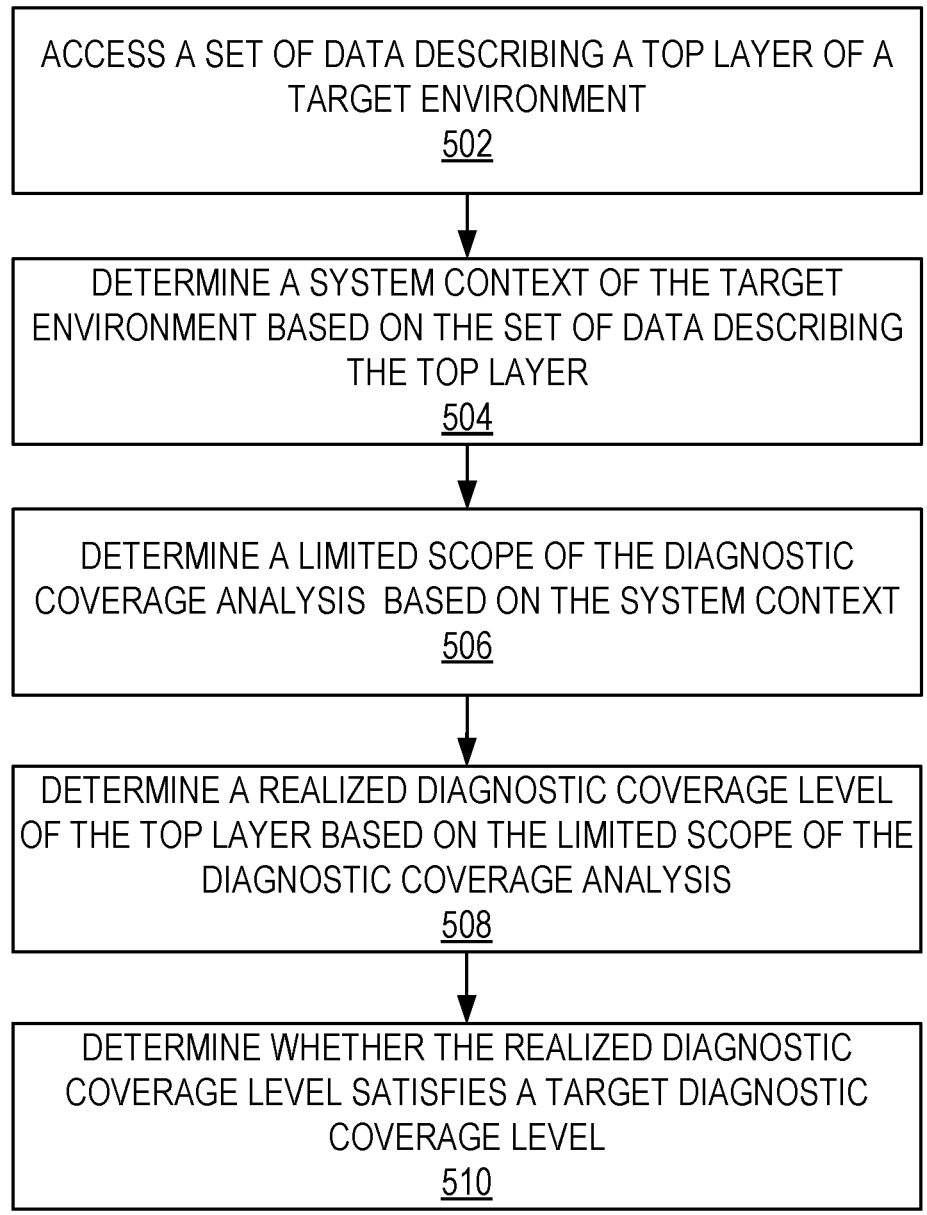
FIG. 5 is a flowchart showing a method for analyzing a top layer of a target environment based on system context, according to some example embodiments.

FIG. 5 is a flowchart showing a method 500 for analyzing a top layer of a target environment based on system context, according to some example embodiments. The method 500 may be embodied in computer readable instructions for execution by one or more processors such that the operations of the method 500 may be performed in part or in whole by receive the functional safety system 100; accordingly, the method 500 is described below by way of example with reference to the functional safety system 100. However, it shall be appreciated that at least some of the operations of the method 500 may be deployed on various other hardware and/or software configurations and the method 500 is not intended to be limited to the functional safety system 100.

At operation 502, the data accessing component 102 accesses a set of data describing a top layer of a target environment.

At operation 504, the system context constraint component 114 determines a system context of the target environment based on the set of data describing the top layer. For example, the system context constraint component 114 determines the requirements, design and application of the target environment, based on the set of data describing the top layer.

At operation 506, the diagnostic coverage determination component 104 determines a limited scope of the diagnostic coverage analysis based on the system context. The system context can be used to limit the scope of a diagnostic coverage analysis based on the particular application. For example, the system context can be used to limit the scope of the diagnostic coverage analysis to the portions of the target environment that are used within the given application. To determine the limited scope of the diagnostic coverage analysis, the system context constraint component 114 identifies any functions and/or IP that are not needed within the known system context of the target environment. The diagnostic coverage determination component 104 may then identify a subset of the target environment that is used within the given application, which may define the limited scope of the diagnostic coverage analysis.

At operation 508, diagnostic coverage determination component 104 determines a realized diagnostic coverage level of the top level based on the limited scope of the diagnostic coverage analysis. For example, the realized diagnostic coverage level of the top level is determined based on the system context can be used to limit the scope of a diagnostic coverage analysis based on the subset of the target environment that is used within the given application.

At operation 510, the target diagnostic coverage level satisfaction component 106 determines whether the realized diagnostic coverage level satisfies a target diagnostic coverage level. For example, the target diagnostic coverage level satisfaction component 106 compares the realized diagnostic coverage level determined by the diagnostic coverage determination component 104 to the target diagnostic coverage level.

Figure 6:
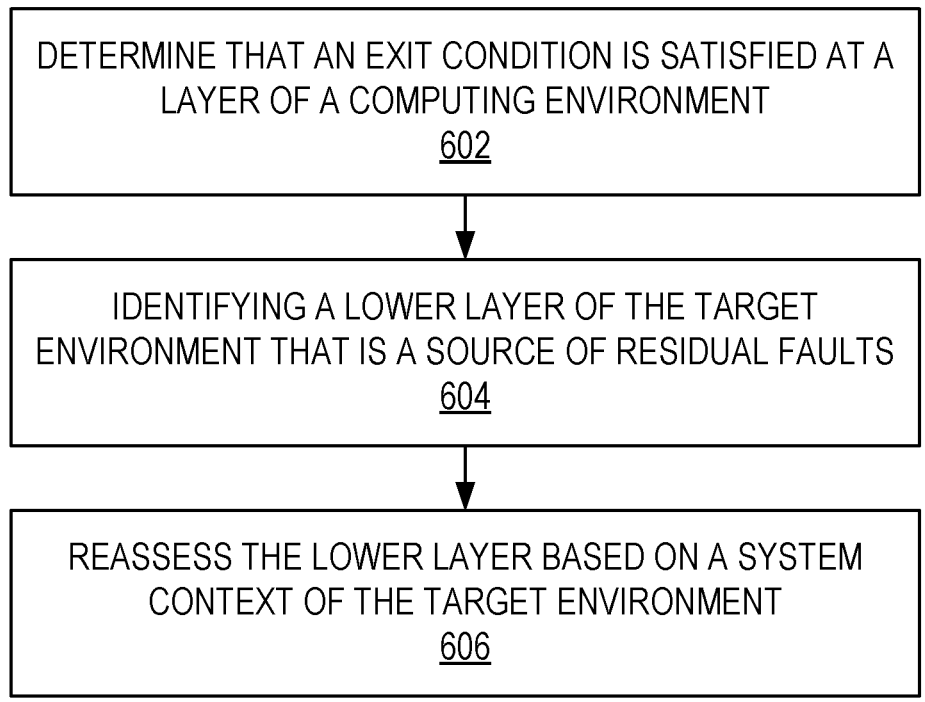
FIG. 6 is a flowchart showing a method of applying system context to lower layers of a target environment, according to some example embodiments.

FIG. 6 is a flowchart showing a method 600 of applying system context to lower layers of a target environment, according to some example embodiments. The method 600 may be embodied in computer readable instructions for execution by one or more processors such that the operations of the method 600 may be performed in part or in whole by a functional safety system 100; accordingly, the method 600 is described below by way of example with reference to the functional safety system 100. However, it shall be appreciated that at least some of the operations of the method 600 may be deployed on various other hardware and/or software configurations and the method 600 is not intended to be limited to the functional safety system 100.

At operation 602, the additional safety mechanism identification component 108 determines that an exit condition has been satisfied at a layer of a target environment. For example, the exit condition may be a specified time period elapsing (e.g., a timeout), a determination that all additional safety mechanisms have been exhausted, and/or that addition of additional safety measures will not increase the diagnostic coverage level beyond a predetermined threshold. For example, the threshold may indicate a minimum level of effectiveness at increasing the realized diagnostic coverage level At operation 604, the residual fault determination component 112 identifies a lower layer of the target environment that is a source of residual faults. For example, the residual fault determination component 112 can identify the source layer of the residual faults based on tracking the layers at which the residual fault was introduced and/or based on a provided input file.

At operation 606, the functional safety system 100 reassesses the lower layer based on a system context of the target environment. For example, the lower layer can be reassessed based on a limited scope of a diagnostic coverage analysis that is determined based on the system context.

Software Architecture

Figure 7:
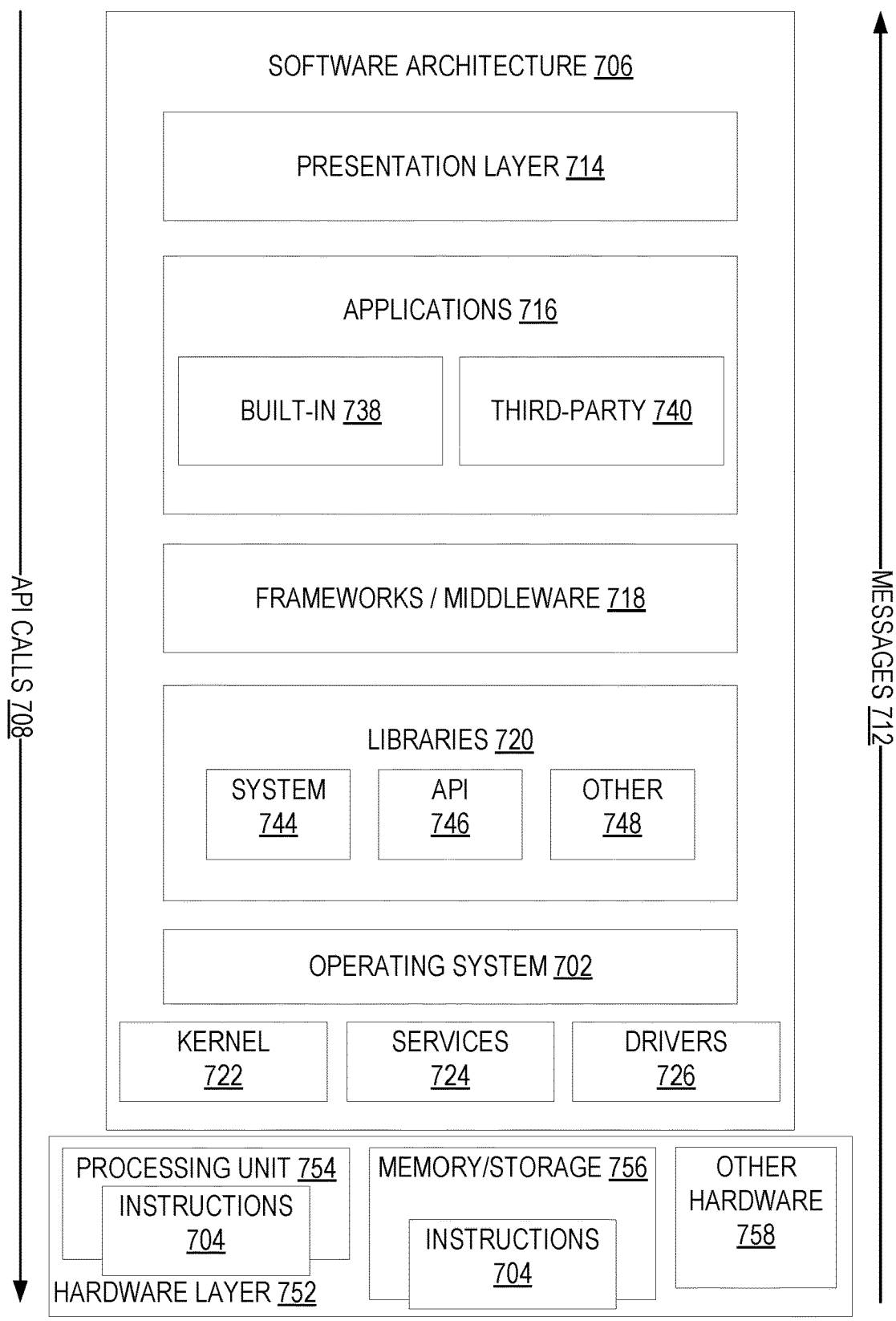
FIG. 7 is a block diagram illustrating an example software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality, such as the Open Systems Interconnection model (OSI model). For example, the software architecture 706 may include layers such as an operating system 702, libraries 720, frameworks/middleware 718, applications 716, and a presentation layer 714. Operationally, the applications 716 and/or other components within the layers may invoke application programming interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
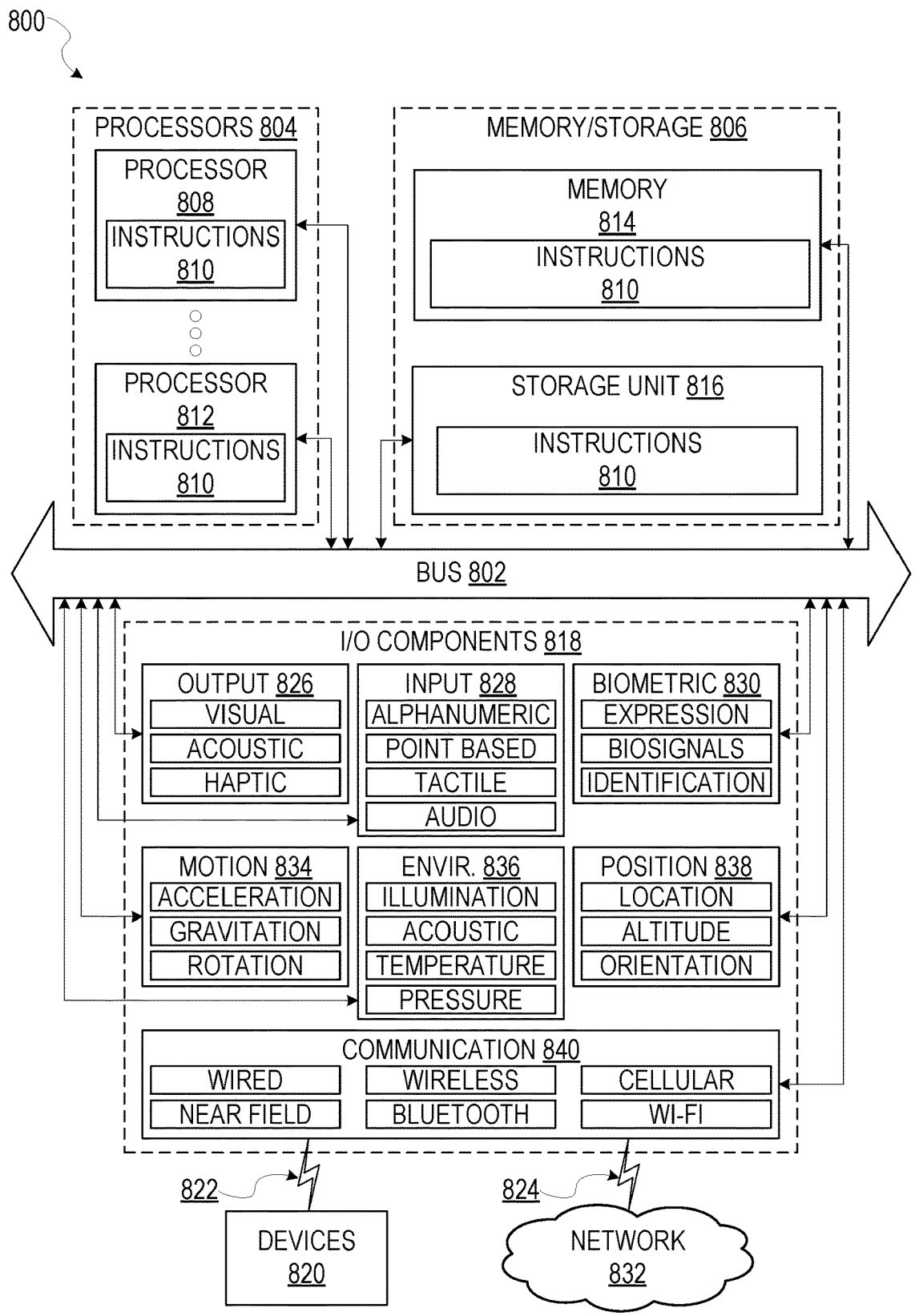
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 804 (sometimes referred to as "cores") that may execute instructions 810 contemporaneously.

What is claimed is:

1. A method comprising:
   determining, by a functional safety system, a first realized diagnostic coverage level of a target environment based on a first set of data describing a first system layer of the target environment, the first realized diagnostic coverage level describing effectiveness of one or more safety mechanisms of the target environment at detecting faults in the target environment at the first system layer;
   determining, by the functional safety system, that the first realized diagnostic coverage level is less than a target diagnostic coverage level for the target environment; and
   determining, by the functional safety system, a second realized diagnostic coverage level of the target environment based on a second set of data describing a second system layer of the target environment and first fault data describing residual faults of the first system layer, the second realized diagnostic coverage level describing effectiveness of one or more safety mechanisms of the target environment at detecting faults in the target environment at the second system layer, the second system layer being higher than the first system layer in the target environment.

2. The method of claim 1, further comprising:
   determining, by the functional safety system, that the second realized diagnostic coverage level is less than the target diagnostic coverage level for the target environment; and
   determining, by the functional safety system, a third realized diagnostic coverage level of a target environment based on a third set of data describing a third system layer of the target environment and second fault data describing residual faults of the second system layer, the third system layer being higher than the second system layer in the target environment.

3. The method of claim 1, further comprising:
   identifying, by the functional safety system and based on the first realized diagnostic coverage level, a first set of additional safety mechanisms to implement at the first system layer of the target environment to increase the first realized diagnostic coverage level; and
   determining, by the functional safety system, a third realized diagnostic coverage level of the target environment based on a third set of data describing the first system layer of the target environment implemented with the first set of additional safety mechanisms.

4. The method of claim 3, further comprising:
   determining, by the functional safety system, that the third realized diagnostic coverage level is less than the target diagnostic coverage level for the target environment; and
   determining, by the functional safety system, that an exit condition has been triggered, wherein determining the second realized diagnostic coverage level of the target environment is performed in response to determining that the exit condition has been triggered.

5. The method of claim 4, wherein determining that the exit condition has been triggered comprises:
   determining, by the functional safety system, that an increase to the third realized diagnostic coverage level resulting from implementing additional safety mechanisms at the first system layer is less than a threshold increase.

6. The method of claim 4, wherein determining that the exit condition has been triggered comprises:
   determining, by the functional safety system, that additional safety mechanisms have been exhausted at the first system layer.

7. The method of claim 1, wherein the target environment includes at least one Safety Element out of Context (SEooC) component.

8. The method of claim 1, wherein the second system layer of the target environment is a highest layer in the target environment and the second realized diagnostic coverage level of the target environment is further determined based on a system context of the target environment.

9. The method of claim 8, further comprising:
   determining that the second realized diagnostic coverage level is less than the target diagnostic coverage level for the target environment; and
   determining a third realized diagnostic coverage level of the target environment based on the first set of data describing the first system layer of the target environment and the system context of the target environment.

10. The method of claim 9, wherein determining the third realized diagnostic coverage level comprises:
    identifying, based on the system context of the target environment, a portion of the first system layer that is not needed to provide functionality of the target environment;
    determining a subset of the first system layer based on the portion of the first system layer that is not needed to provide functionality of the target environment; and
    determining the third realized diagnostic coverage level based on the subset of the first system layer.

11. A functional system comprising:
one or more computer processors; and
one or more computer-readable mediums storing instructions that, when executed by the one or more computer processors, cause the functional system to perform operations comprising:
   determining a first realized diagnostic coverage level of a target environment based on a first set of data describing a first system layer of the target environment, the first realized diagnostic coverage level describing effectiveness of one or more safety mechanisms of the target environment at detecting faults in the target environment at the first system layer;
   determining that the first realized diagnostic coverage level is less than a target diagnostic coverage level for the target environment; and
   determining a second realized diagnostic coverage level of the target environment based on a second set of data describing a second system layer of the target environment and first fault data describing residual faults of the first system layer, the second realized diagnostic coverage level describing effectiveness of one or more safety mechanisms of the target environment at detecting faults in the target environment at the second system layer, the second system layer being higher than the first system layer in the target environment.

12. The functional system of claim 11, the operations further comprising:
   determining that the second realized diagnostic coverage level is less than the target diagnostic coverage level for the target environment; and
   determining a third realized diagnostic coverage level of a target environment based on a third set of data describing a third system layer of the target environment and second fault data describing residual faults of the second system layer, the third system layer being higher than the second system layer in the target environment.

13. The functional system of claim 11, the operations further comprising:
   identifying, based on the first realized diagnostic coverage level, a first set of additional safety mechanisms to implement at the first system layer of the target environment to increase the first realized diagnostic coverage level; and
   determining a third realized diagnostic coverage level of the target environment based on a third set of data describing the first system layer of the target environment implemented with the first set of additional safety mechanisms.

14. The functional system of claim 13, the operations further comprising:
   determining that the third realized diagnostic coverage level is less than the target diagnostic coverage level for the target environment; and
   determining that an exit condition has been triggered, wherein determining the second realized diagnostic coverage level of the target environment is performed in response to determining that the exit condition has been triggered.

15. The functional system of claim 14, wherein determining that the exit condition has been triggered comprises:
   determining that an increase to the third realized diagnostic coverage level resulting from implementing additional safety mechanisms at the first system layer is less than a threshold increase.

16. The functional system of claim 11, wherein the target environment includes at least one Safety Element out of Context (SEooC) component.

17. The functional system of claim 11, wherein the second system layer of the target environment is a highest layer in the target environment and the second realized diagnostic coverage level of the target environment is further determined based on a system context of the target environment.

18. The functional system of claim 17, the operations further comprising:
   determining that the second realized diagnostic coverage level is less than the target diagnostic coverage level for the target environment; and
   determining a third realized diagnostic coverage level of the target environment based on the first set of data describing the first system layer of the target environment and the system context of the target environment.

19. The functional system of claim 18, wherein determining the third realized diagnostic coverage level comprises:
   identifying, based on the system context of the target environment, a portion of the first system layer that is not needed to provide functionality of the target environment;
   determining a subset of the first system layer based on the portion of the first system layer that is not needed to provide functionality of the target environment; and
   determining the third realized diagnostic coverage level based on the subset of the first system layer.

20. A non-transitory computer-readable medium storing instructions that, when executed by one or more computer processors of one or more computing devices that implement a functional safety system, cause the one or more computing devices to perform operations comprising:
   determining a first realized diagnostic coverage level of a target environment based on a first set of data describing a first system layer of the target environment, the first realized diagnostic coverage level describing effectiveness of one or more safety mechanisms of the target environment at detecting faults in the target environment at the first system layer;
   determining that the first realized diagnostic coverage level is less than a target diagnostic coverage level for the target environment; and
   determining a second realized diagnostic coverage level of the target environment based on a second set of data describing a second system layer of the target environment and first fault data describing residual faults of the first system layer, the second realized diagnostic coverage level describing effectiveness of one or more safety mechanisms of the target environment at detecting faults in the target environment at the second system layer, the second system layer being higher than the first system layer in the target environment.

* * * * *